(12) United States Patent
Sakuragi et al.

(10) Patent No.: US 10,897,177 B2
(45) Date of Patent: Jan. 19, 2021

(54) MOTOR

(71) Applicant: Minebea Mitsumi Inc., Nagano (JP)

(72) Inventors: Katsunori Sakuragi, Yonago (JP); Takane Oda, Yonago (JP)

(73) Assignee: Minebea Mitsumi Inc., Nagano (JP)

( * ) Notice: Subject to any disclaimer, the term of this patent is extended or adjusted under 35 U.S.C. 154(b) by 182 days.

(21) Appl. No.: 16/171,677

(22) Filed: Oct. 26, 2018

(65) Prior Publication Data

US 2019/0131845 A1    May 2, 2019

(30) Foreign Application Priority Data

Oct. 30, 2017   (JP) .................. 2017-209155

(51) Int. Cl.

| H02K 5/16 | (2006.01) |
| H02K 5/173 | (2006.01) |
| F16C 19/06 | (2006.01) |
| H02K 7/08 | (2006.01) |
| H02K 1/27 | (2006.01) |
| H02K 5/15 | (2006.01) |
| F16C 35/04 | (2006.01) |
| F16C 19/54 | (2006.01) |
| H02K 5/22 | (2006.01) |
| H02K 11/22 | (2016.01) |

(52) U.S. Cl.
CPC .......... *H02K 5/1735* (2013.01); *F16C 19/06* (2013.01); *F16C 19/54* (2013.01); *F16C 35/042* (2013.01); *H02K 1/278* (2013.01); *H02K 5/15* (2013.01); *H02K 7/085* (2013.01); *F16C 2380/26* (2013.01); *H02K 5/225* (2013.01); *H02K 11/22* (2016.01)

(58) Field of Classification Search
CPC .............................................. H02K 5/15–1737
See application file for complete search history.

(56) References Cited

U.S. PATENT DOCUMENTS 6,717,306 B1 *  4/2004  Kudou ..................... H02K 3/58
                                                                310/81

FOREIGN PATENT DOCUMENTS

JP      2010-035267 A    2/2010

* cited by examiner

*Primary Examiner* — Ramon M Barrera
(74) *Attorney, Agent, or Firm* — Carrier Blackman & Associates, P.C.; William D. Blackman; Joseph P. Carrier

(57) ABSTRACT

A motor including: a frame having an inner peripheral portion; a holder configured to be supported by the frame; a shaft passing through the inner peripheral portion of the frame; and a bearing configured to support the shaft, and the holder includes: a tubular portion configured to hold the bearing; and an outer peripheral portion provided with a plurality of hole portions arranged in a circumferential direction, and each of portions of the inner peripheral portion of the frame are inserted into a distinct one of the plurality of hole portions.

7 Claims, 12 Drawing Sheets

MOTOR

CROSS-REFERENCE TO RELATED APPLICATIONS

This application claims priority from Japanese Patent Application No. 2017-209155 filed on Oct. 30, 2017, the entire contents of which are incorporated herein by reference.

TECHNICAL FIELD

The present disclosure relates to a motor, and more particularly, to a motor having a holder provided with a bearing for supporting a shaft.

BACKGROUND

A motor is widely used as a driving source in, for example, office equipment and home appliances. A shaft of a motor is supported on a stator side by a bearing. For example, a structure of a conventional motor in which a bearing is held by a holder provided in a frame equipped with a stator is known.

Meanwhile, JP-A-2010-035267 discloses a structure of an electric motor in which an electric motor attachment is provided in an output shaft supporting unit for supporting an output shaft.

By the way, in a motor having a holder for holding a bearing, it is important to increase the reliability of the attachment structure of the holder to a frame of the motor.

SUMMARY

The present disclosure is intended to deal with such a problem. That is, the present disclosure aims to provide a motor having good performance.

In order to achieve the above object, a motor according to an aspect of the present disclosure includes: a frame including an inner peripheral portion; a holder supported by the frame; a shaft passing through the inner peripheral portion of the frame; and a bearing supporting the shaft, and the holder includes: a tubular portion holding the bearing; and an outer peripheral portion including a plurality of hole portions arranged in a circumferential direction, and portions of the inner peripheral portion of the frame is inserted into the plurality of hole portions.

According to the present disclosure, it is possible to provide the motor having good performance.

DETAILED DESCRIPTION

Hereinafter, a motor in an embodiment of the present disclosure will be described.

Embodiment

Figure 1:
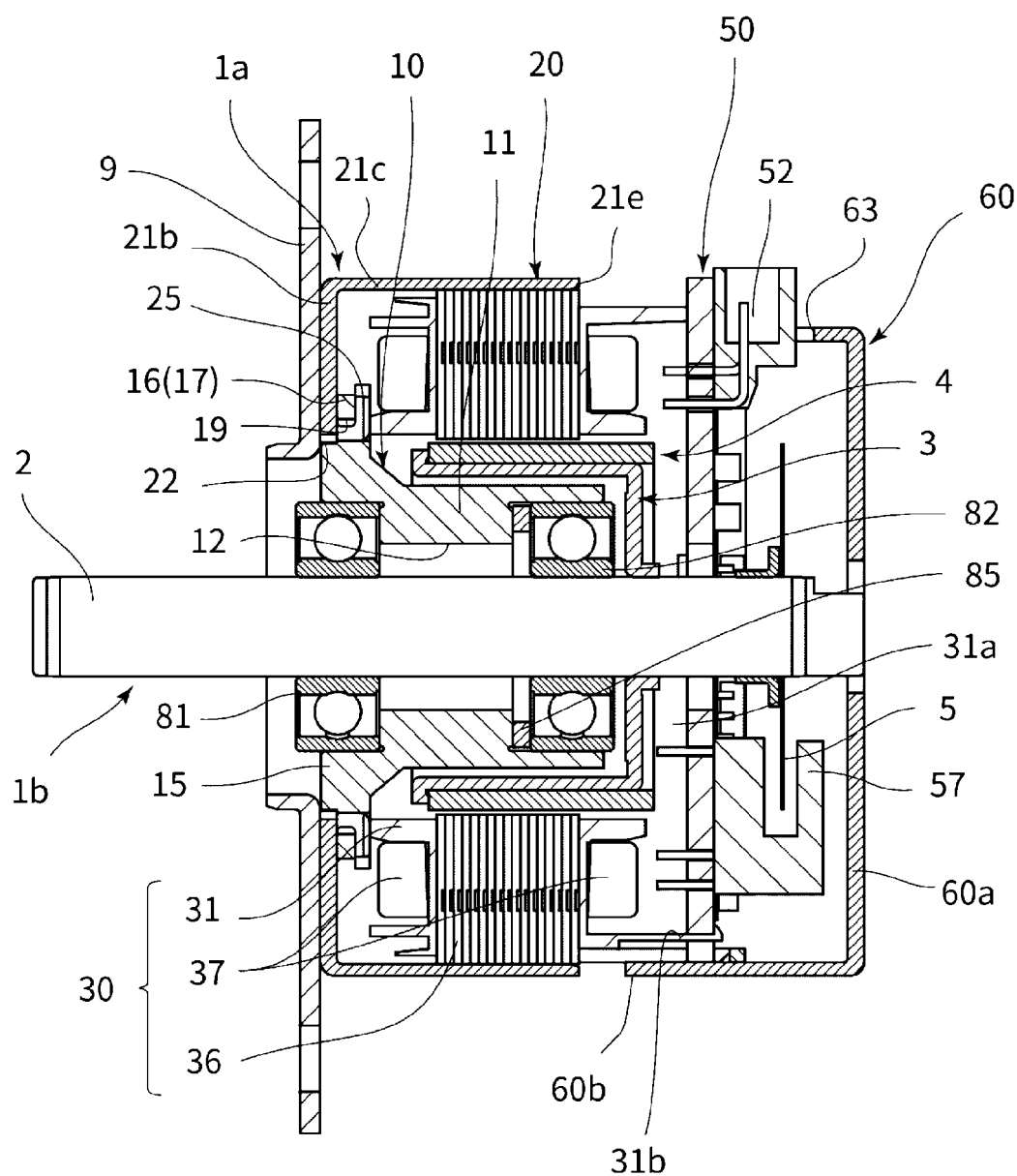
FIG. 1 is a side sectional view showing a motor in an embodiment of the disclosure.

FIG. 1 is a side sectional view showing a motor 1 in an embodiment of the present disclosure.

In the following description, the left and right direction (longitudinal direction of a shaft 2) in FIG. 1 may be referred to as the axial direction or the rotational axis direction. In particular, the left direction (the direction of a substrate 50 on the side where a coil 37 or the like is disposed) in FIG. 1 may be referred as the front, and the right direction (the direction of the substrate 50 on the side where a cover 60 is disposed) in FIG. 1 may be referred to as the rear (this is similarly applied to "front" or "rear" in the expressions such as the frontward, the rearward, the front side, the rear side, the front end portion and the rear end portion). Further, the direction toward or away from the shaft 2 may be referred to as the radial direction. The direction around the shaft 2 (the direction of rotation of the motor 1) may be referred to as the circumferential direction. Further, for example, the left direction in FIG. 1 may be referred to as the output shaft side, and the right direction in FIG. 1 may be referred to as the opposite side of the output shaft. Meanwhile, the terms such as the right, left, front and rear in the following description are applied only for the sake of explanation of the motor 1 and do not refer to the directions or the like when the motor 1 is mounted on equipment.

As shown in FIG. 1, the motor (rotating device) 1 roughly includes a columnar frame assembly 1a provided with a stator 30, a rotor 1b supported on the frame assembly 1a so as to be rotatable around the shaft 2, the substrate 50, and the cover 60. In the present embodiment, the motor 1 is a so-called inner rotor type brushless motor.

The rotor 1b includes the shaft (rotary shaft) 2, a rotor yoke 3, and a magnet 4. An encoder substrate 5 is attached to the rear side of the shaft 2. The shaft 2 is held by two bearings 81, 82 held by a holder 10 which is attached to a housing (an example of a frame) 20 of the motor 1.

The rotor yoke 3 is fixed to the shaft 2. The rotor yoke 3 has a bowl shape opened forward.

The magnet 4 is formed in an annular shape and fixed to an outer peripheral surface of the rotor yoke 3. An outer peripheral portion of the magnet 4 is magnetized so that different magnetic poles are arranged along a circumferential direction.

The encoder substrate 5 is provided on the rear side of the shaft 2. The encoder substrate 5 can be read by an encoder 57 disposed at the substrate 50. The encoder 57 includes sensors such as a Hall element and a light receiving element (not shown). When a Hall element is used as a sensor, a magnet is provided in the encoder substrate 5. When a light receiving element is used as a sensor, a slit through which light passes is provided in the encoder substrate 5. The encoder 57 may include a brush and a power supply part. In this case, a wiring which is in contact with the brush is formed in the encoder substrate 5.

The frame assembly 1a is configured by a plate 9, the holder 10, the housing 20, and the stator 30.

The stator 30 includes an insulator 31, a core 36, and the coil 37. The stator 30 has a substantially tubular shape. A space in which the rotor 1b and the holder 10 are disposed is provided in the center portion of the stator 30 in a radial direction. The stator 30 has an opening portion 31a opened rearward.

The insulator 31 is formed with an insulating resin member. The insulator 31 is a member having an annular planar shape. The core 36 is a silicon steel plate or a plate (for example, a steel plate) formed with a ferromagnetic material. The core 36 has a protruding portion that radially protrudes toward the shaft 2. The coil 37 is wound around the protruding portion. The protruding portion is a magnetic pole portion (salient pole portion) that is excited by energizing the coil 37. The salient pole portion faces the magnet 4 on the side of the rotor 1b. That is, the stator 30 has a plurality of salient pole portions arranged in the circumferential direction. As current flows through the coil 37 so as to drive the motor 1, each salient pole portion is excited to rotate the shaft 2.

An end portion 31b protruding rearward is formed in the vicinity of a rear end portion of the insulator 31. The end portion 31b has an annular planar shape. The inside of the end portion 31b is the opening portion 31a. In other words, the end portion 31b forms the opening portion 31a. A fixing portion for fixing the cover 60 and the substrate 50 to the insulator 31 is provided in a part of the end portion 31b. The fixing portion is engaged with the cover 60 and the substrate 50 to fix the cover 60 and the substrate 50 to the insulator 31.

The substrate 50 is attached to an opening portion (i.e., the opening portion 31a of the stator 30) on the rear side of the frame assembly 1a. Specifically, the substrate 50 is mounted in the vicinity of the end portion 31b of the insulator 31. The substrate 50 in the present embodiment is a circuit board at which a drive circuit of the motor 1 is mounted. The substrate is formed in a plate shape having a substantially circular planar shape. The configuration of the substrate 50 is not limited to the present embodiment. A substrate on which a plurality of wirings is formed or a substrate which covers the opening portion of the housing 20 as described later may be used as the substrate 50.

A connector part 52 connected to an external device, the encoder 57 for grasping the rotation state of the motor 1, and other circuit elements are mounted on the substrate 50. The connector part 52 is configured by a drive circuit for driving the motor 1 and a connector portion for receiving an input signal from an external control circuit and transmitting an output signal to the external control circuit. The encoder 57 detects the rotational number and rotational direction of the motor 1 and feeds back the detection results to the external control circuit. These circuit elements or the like are mainly attached to the rear surface of the substrate 50. Further, the substrate 50 is connected to each coil 37. When an input signal transmitted from the external control circuit is inputted to the substrate 50 via the connector part 52, the substrate 50 energizes the coil 37, rotates the rotor 1b and drives the motor 1.

The cover 60 roughly has a bowl shape having an opening portion opened forward. Specifically, the cover 60 has a tubular shape having a bottom portion. The opening portion of the cover 60 is formed by an annular end portion (front end portion). The surface of the cover 60 on the rear side is a bottom portion 60a. A cylinder portion 60b extending forward from the bottom portion 60a and having a tubular planar shape is provided on the front side of the bottom portion 60a. The cover 60 is disposed behind the substrate 50. The cover 60 is disposed so as to cover the entire rear surface of the substrate 50. In this way, drive circuits and electronic components disposed at the substrate 50 are protected. The cylinder portion 60b of the cover 60 is an engaging portion that engages with the insulator 31. The cylinder portion 60b is engaged with a part of the end portion 31b of the insulator 31, and the cover 60 is fixed to the stator 30.

An opening portion 63 is formed in the portion of the cylinder portion 60b of the cover 60 where the connector part 52 is provided. The connector part 52 is exposed to the outside of the cover 60 through the opening portion 63. In this way, a harness or the like for connecting to an external device can be connected to the connector part 52.

The housing 20 is a frame of the motor 1. In the present embodiment, the housing 20 accommodates members (e.g., the rotor 1b and the like) constituting the motor 1.

The housing 20 has a tubular shape in which the front portion is closed such that the shaft 2 protrudes from the front central portion. Specifically, the housing 20 has a front surface (an example of an attaching surface) 21b having an opening portion formed by an inner peripheral portion 22, and an outer peripheral portion 21c. A rear end portion 21e of the outer peripheral portion 21c forms an opening portion, and the housing 20 is opened rearward. The opening portion of the front surface 21b formed by the inner peripheral portion 22 is smaller than the opening portion formed by the rear end portion 21e on the rear side. The opening portion of the front surface 21b is a hole portion having a substantially circular shape. The housing 20 can be formed by, for example, performing sheet metal processing on a steel plate. Meanwhile, the material and forming method of the housing 20 is not limited thereto. For example, the housing 20 may be formed using a metal member such as a metal plate.

The stator 30 is disposed inside the housing 20. The stator 30 is fitted and fixed to the inner side of the outer peripheral portion 21c of the housing 20.

The holder 10 is disposed in the front central portion of the housing 20. The holder 10 has a tubular portion (inner peripheral portion) 11, a protruding portion 15, and an outer peripheral portion 16. For example, the holder 10 is a die-cast member or a resin member or the like.

The protruding portion 15 protrudes forward from the outer peripheral portion 16 in the rotational axis direction (the longitudinal direction of the shaft 2). The protruding portion 15 has a tubular shape. An outer diameter D1 (shown in FIG. 4) of the protruding portion 15 is equal to or slightly smaller than an inner diameter D2 (shown in FIG. 5) of an opening portion formed by the inner peripheral portion 22 of the housing 20.

The outer peripheral portion 16 is a flange portion having an outer diameter larger than an outer diameter of the protruding portion 15. In other words, the outer peripheral portion 16 is a flange portion having a width larger than a width of the protruding portion 15 in the radial direction. The outer peripheral portion 16 has a substantially circular planar shape except for a portion where an extending portion 17 is provided as described later.

The holder 10 is attached to the front surface 21b that is an attachment surface. The holder 10 is supported on the housing 20 in a state where the protruding portion 15 is fitted into the opening portion formed by the inner peripheral portion 22 of the housing 20 and a front surface of the outer peripheral portion 16 is in contact with an inner surface (rear surface) of the front surface 21b.

The tubular portion 11 of the holder 10 has an inner wall surface 12 at the central portion in the radial direction. The inner wall surface 12 constitutes a space through which the shaft 2 passes. Bearing holding portions 13, 14 are formed on the inner wall surface 12. The bearings 81, 82 are fixed to the vicinity of the front end portion and the vicinity of the rear end portion of the tubular portion 11 with respect to the central portion of the tubular portion 11 in the rotational axis direction, respectively. That is, the tubular portion 11 of the holder 10 holds a plurality of bearings 81, 82. In the present embodiment, the bearings 81, 82 are press-fitted into the bearing holding portions 13, 14 (shown in FIGS. 3 and 4 or the like) of the holder 10. However, the present disclosure is not limited thereto.

The bearings 81, 82 are adapted to support the shaft 2. The shaft 2 is rotatably fixed (in the present embodiment, press-fitted) to the bearings 81, 82. That is, the shaft 2 passes through the inner peripheral portion 22 of the housing 20 and the inside of the holder 10 (for example, the tubular portion 11). The shaft 2 is rotatable with respect to each member of the frame assembly 1a while being supported by the two bearings 81, 82. Meanwhile, although a spacer 85 is disposed in front of the bearing 82, the present disclosure is not limited thereto.

Each of the bearings 81, 82 is a ball bearing. The type of the bearings 81, 82 is not limited to a ball bearing. One or both of the ball bearings 81, 82 may be a bearing of other type, such as a metal sliding bearing, for example. Further, in addition to the bearings 81, 82, other bearings may be additionally provided in the motor 1.

The magnet 4 and the tubular portion of the rotor yoke 3 supporting the magnet 4 are located at a space between an outer peripheral surface of the tubular portion 11 of the holder 10 and an inner peripheral portion of the stator 30. Further, the bearing 82 is located inside the rotor yoke 3. The bearing 82 located on the rear side of the bearing 81 can be disposed on the front side of the substrate 50. Therefore, the dimension in the front and rear direction of the motor 1 can be reduced, as compared with the case where the bearing 82 is disposed on the rear side of the substrate 50.

The plate 9 has a hole portion or the like through which a bolt or the like for mounting the motor 1 on a device passes. The plate 9 is attached to the front surface of the frame assembly 1a, that is, the front surface 21b of the housing 20. In the present embodiment, the plate 9 is fixed to the housing 20 by welding or the like, for example.

Here, in the present embodiment, the holder 10 is fixed to the housing 20 in the following manner. Specifically, the outer peripheral portion 16 of the holder 10 has a plurality of hole portions 19 arranged in the circumferential direction. Further, a part of the inner peripheral portion 22 of the housing 20 is inserted into the plurality of hole portions 19. In the present embodiment, a plurality of protruding portions 25 which are portions of the inner peripheral portion 22 of the housing 20 is arranged on the front surface 21b of the housing 20 in the circumferential direction. The plurality of protruding portions 25 protrudes toward the side where the holder 10 is disposed, that is, toward the rear side, and pass through the plurality of hole portions 19.

Further, a part of the inner peripheral portion 22 of the housing 20 that has passed through the hole portion 19 is bent. That is, the plurality of protruding portions 25 that has passed through the hole portions 19 are bent. A part of the outer peripheral portion 16 of the holder 10 is located between the front surface 21b of the housing 20 and a part of the plurality of protruding portions 25 bent. That is, a part of the outer peripheral portion 16 of the holder 10 is sandwiched between the front surface 21b of the housing 20 and a part of the plurality of protruding portions 25 in the front and rear direction. Meanwhile, a part of the inner peripheral portion 22 of the housing 20 has a bent portion and an end portion. The end portion is a part of the protruding portion 25. The bent portion has a surface facing the hole portion 19 in the radial direction.

Each of the plurality of protruding portions 25 has a plate shape. A groove portion (an example of a recessed portion) 25c (shown in FIG. 7 or the like) is formed on one surface of each of the plurality of protruding portions 25. Each of the plurality of protruding portions 25 is bent in such a manner that the portion where the groove portion 25c is formed becomes a valley. The groove portion 25c is provided in the bent portion of the inner peripheral portion 22 of the housing 20. The groove portion 25c is provided in a surface of the bent portion facing the hole portion 19 in the radial direction.

Hereinafter, a more specific mounting structure of the holder 10 to the housing 20 in the present embodiment will be described.

Figure 2:
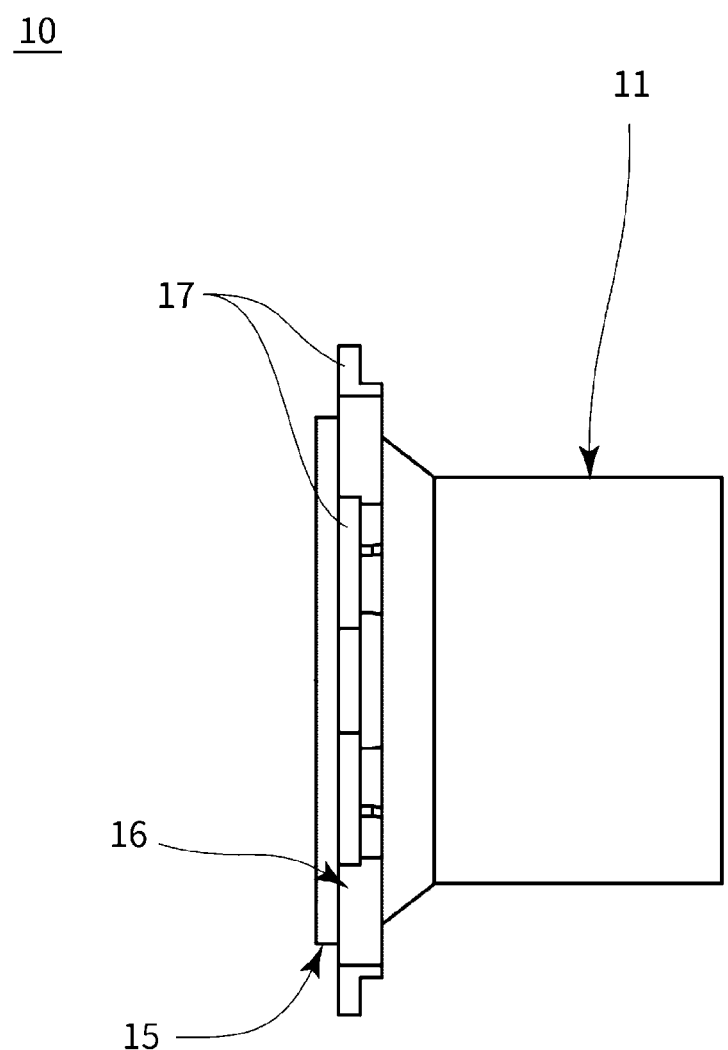
FIG. 2 is a side view of a holder.
Figure 3:
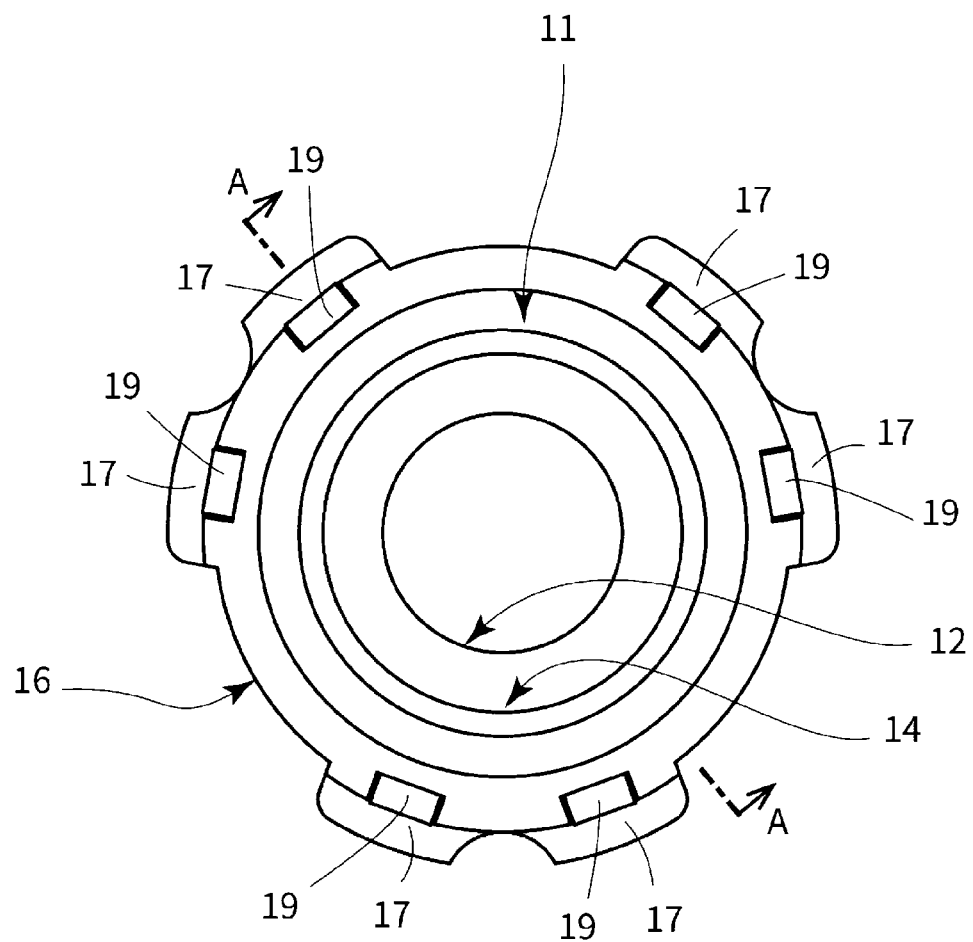
FIG. 3 is a rear view (back elevation view) of the holder.
Figure 4:
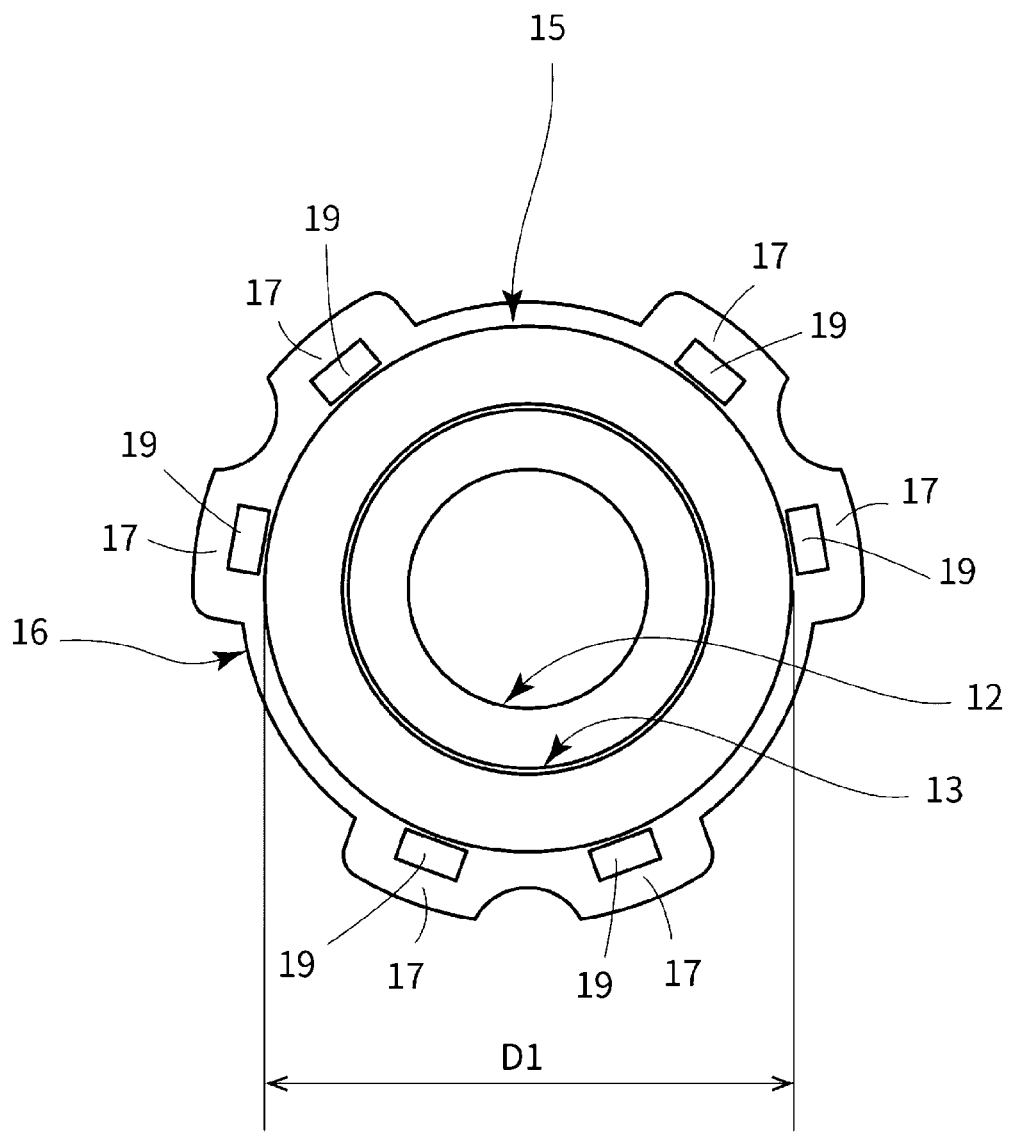
FIG. 4 is a front view (elevation view) of the holder.

FIG. 2 is a side view of the holder 10. FIG. 3 is a rear view (back elevation view) of the holder 10. FIG. 4 is a front view (elevation view) of the holder 10.

As shown in FIGS. 3 and 4, the bearing holding portions 13, 14 are formed on the front side and the rear side of the holder 10, respectively.

As shown in FIGS. 2 to 4, the outer peripheral portion 16 of the holder 10 has six extending portions 17. Each of the extending portions 17 is a portion that further protrudes radially outward (toward the outer peripheral portion 21c of the housing 20 in the radial direction) from an outer edge of the outer peripheral portion 16 having a substantially circular shape as a whole in the front view. The front surfaces of the extending portions 17 are flush with the front surface of the outer peripheral portion 16. The thickness of each extending portion 17 in the front and rear direction is thinner than that of the outer peripheral portion 16.

In the present embodiment, two extending portions 17 adjacent to each other in the circumferential direction and located relatively close to each other constitute one set. Further, the sets including these two extending portions 17 are arranged at three positions at substantially equal intervals in the circumferential direction. That is, a total of six extending portions 17 are provided in the outer peripheral portion 16. Further, three sets of extending portions 17 adjacent to each other in the circumferential direction are spaced at an interval of 120° around the center of the shaft 2. In this way, at three positions at the outer peripheral surface of the outer peripheral portion 16, the extending portions 17 are positioned at relatively distant positions and relatively small diameter regions are provided. Therefore, a space in which a member can be disposed without interfering with the holder 10 in the rotational axis direction can be provided at a position relatively close to the shaft 2 at the front surface 21b of the housing 20 or inside the housing 20. Meanwhile, the arrangement of the extending portions 17 is not limited to such an aspect. A plurality of extending portions 17 may be provided at substantially equal intervals in the circumferential direction. Further, the number of the extending portions 17 is not limited to six, but may be less than six or more than six.

The hole portion 19 is formed in each of the extending portions 17. That is, six hole portions 19 arranged in the circumferential direction are provided in the outer peripheral portion 16. Each hole portion 19 has a substantially rectangular shape as viewed from the rotational axis direction and passes through the holder 10 in the rotational axis direction. The hole portions 19 are formed radially inward of the extending portions 17.

Figure 5:
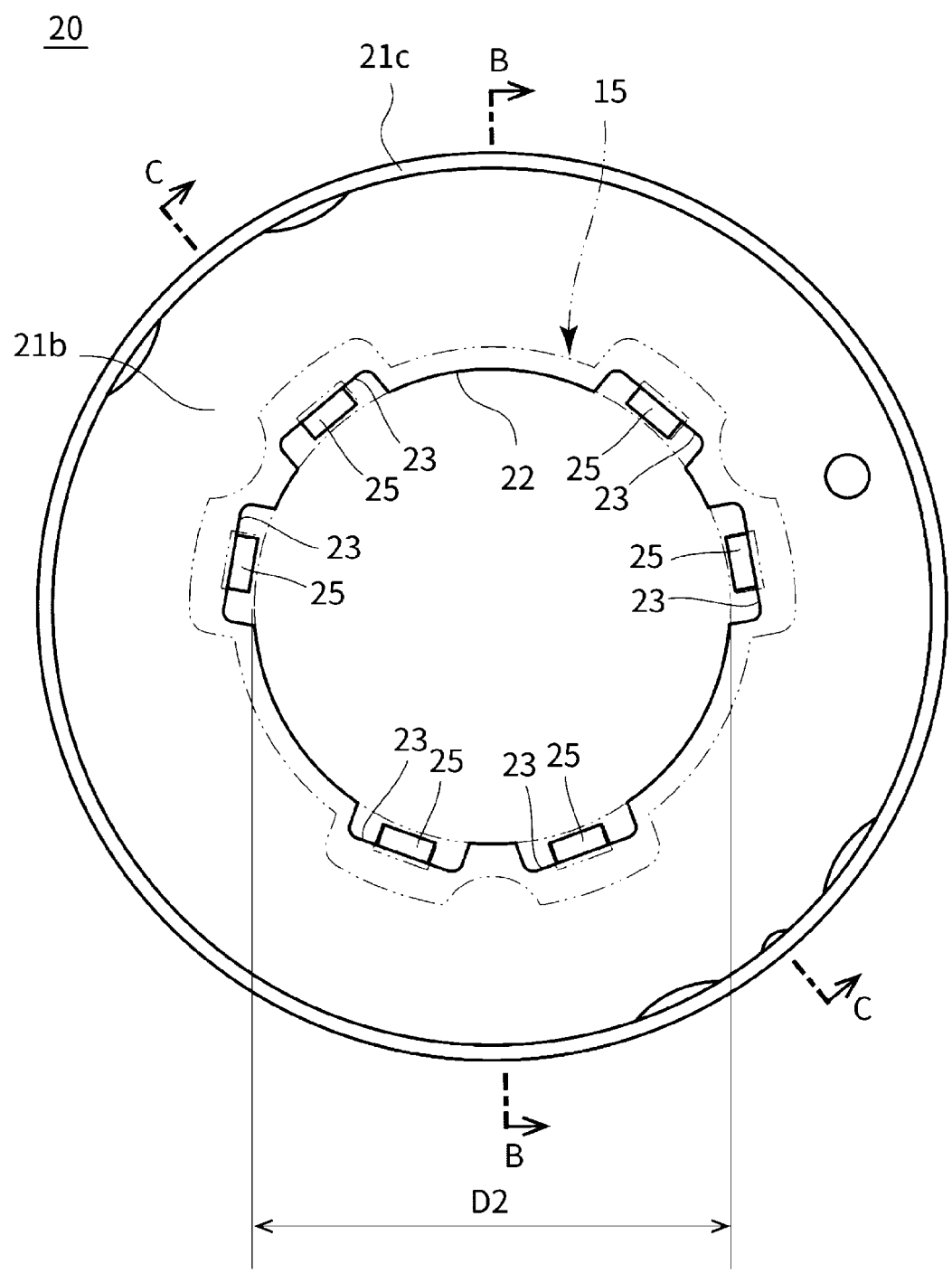
FIG. 5 is a rear view (back elevation view) of a housing in a state where the holder is not attached.
Figure 6:
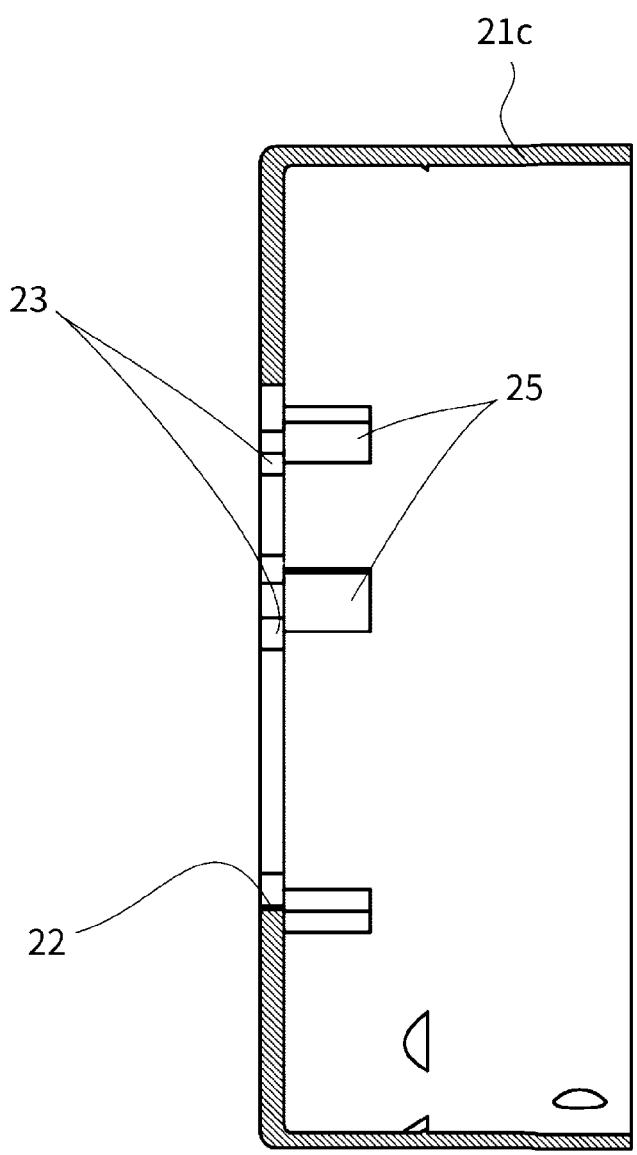
FIG. 6 is a sectional view taken along the line B-B in FIG. 5.

FIG. 5 is a rear view (back elevation view) of the housing 20 in a state where the holder 10 is not attached. FIG. 6 is a sectional view taken along the line B-B in FIG. 5.

In FIG. 5, the two-dot chain line shows the position of the holder 10 supported on the housing 20. Hereinafter, the configuration of the housing 20 in a state where the holder 10 is not attached will be described.

As shown in FIGS. 5 and 6, the front surface 21b of the housing 20 has a substantially circular flat-plate shape as viewed from the rotational axis direction. At the approximate center of the front surface 21b, an opening portion surrounded by the inner peripheral portion 22 having a substantially circular shape as viewed from the rotational axis direction is provided.

At positions of the inner peripheral portion 22 corresponding to the hole portions 19, dent portions 23 and the protruding portions 25 are provided. Each of the dent portions 23 is recessed radially outward from a substantially circular edge (an edge having substantially the same diameter as the protruding portion 15 of the holder 10 indicated by the two-dot chain line in FIG. 5) formed by the inner peripheral portion 22.

The protruding portions 25 are provided inside the dent portions 23. The protruding portions 25 protrude rearward from the front surface 21b. The inner surface of each protruding portion 25 in the radial direction is positioned radially outward of the substantially circular edge formed by the inner peripheral portion 22. In the present embodiment, each of the protruding portions 25 has a plate shape. Each of the protruding portions 25 is formed in a posture in which a straight line connecting the position where the protruding portion 25 is provided and the center of the shaft 2 is substantially perpendicular to the protruding portion 25. That is, the protruding portions 25 can be bent in the radial direction. In the present embodiment, each of the protruding portions 25 has a substantially rectangular tongue piece shape as viewed in the radial direction from the center of the shaft 2.

The protruding portions 25 are portions of the front surface 21b. That is, the protruding portions 25 are portions of the inner peripheral portion 22.

For example, the protruding portions 25 can be formed by punching out a metal plate constituting the housing 20 so as to form the inner peripheral portion 22, the dent portions 23, and a rectangular tongue piece extending radially inward from an edge of the dent portion 23 and then bending the tongue piece toward the rear. Meanwhile, the method of forming the protruding portions 25 is not limited to this.

An outer peripheral shape of each protruding portion 25 is smaller than an inner peripheral shape of the hole portion 19 corresponding to the protruding portion 25 as viewed from the rotational axis direction. Therefore, each protruding portion 25 can be inserted into the hole portion 19 corresponding to the protruding portion 25.

The holder 10 is attached to the housing 20 in the following manner.

Figure 7:
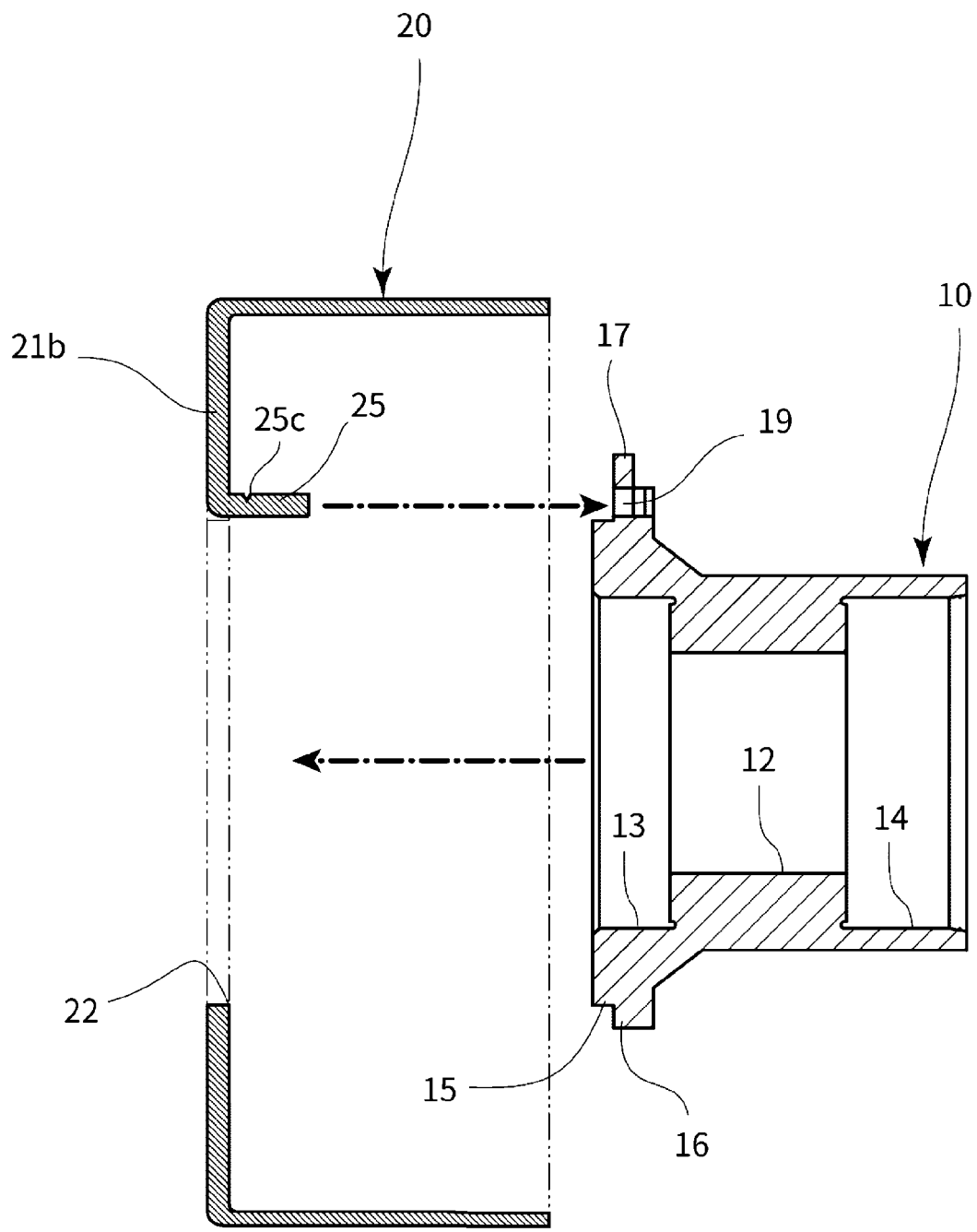
FIG. 7 is a first view for explaining a process of attaching the holder to the housing.
Figure 8:
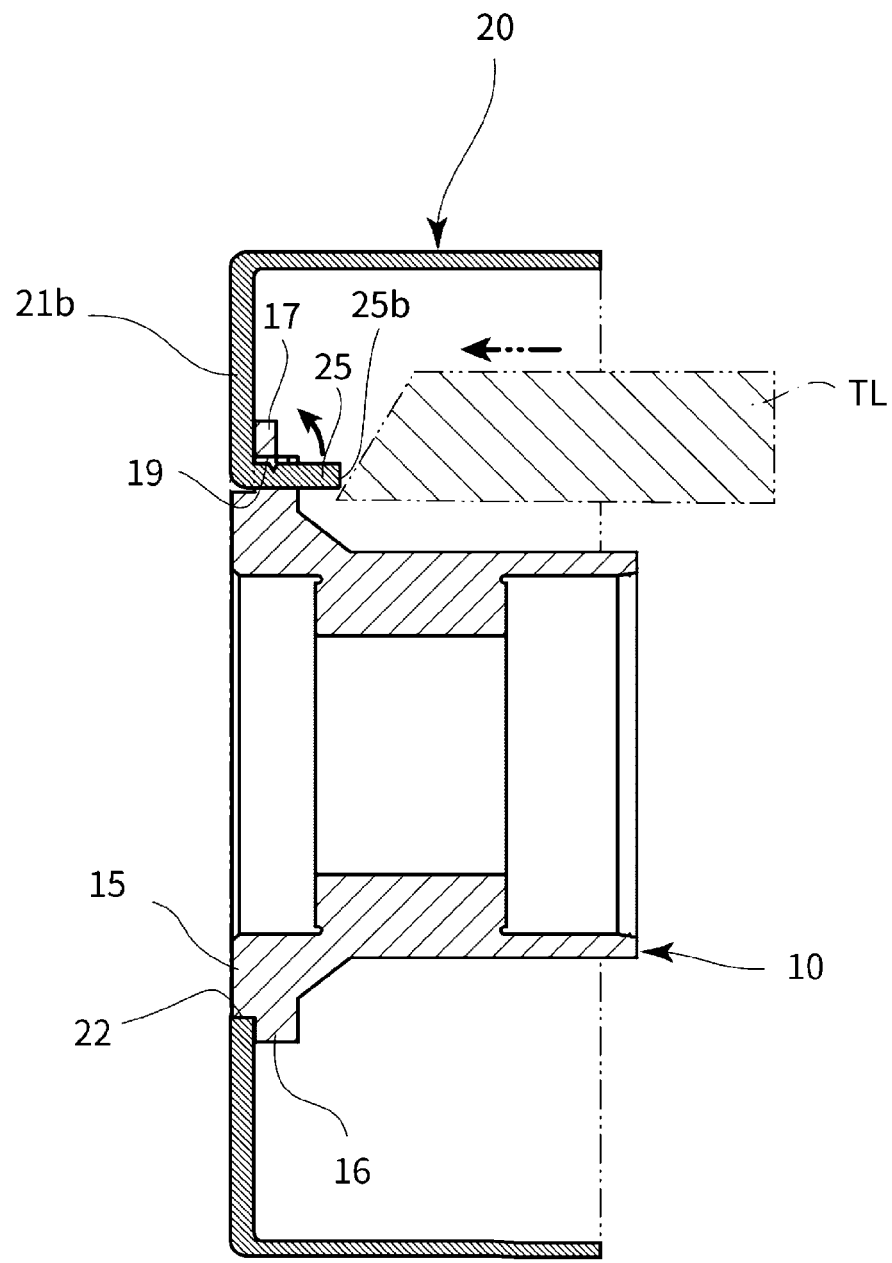
FIG. 8 is a second view for explaining the process of attaching the holder to the housing.
Figure 9:
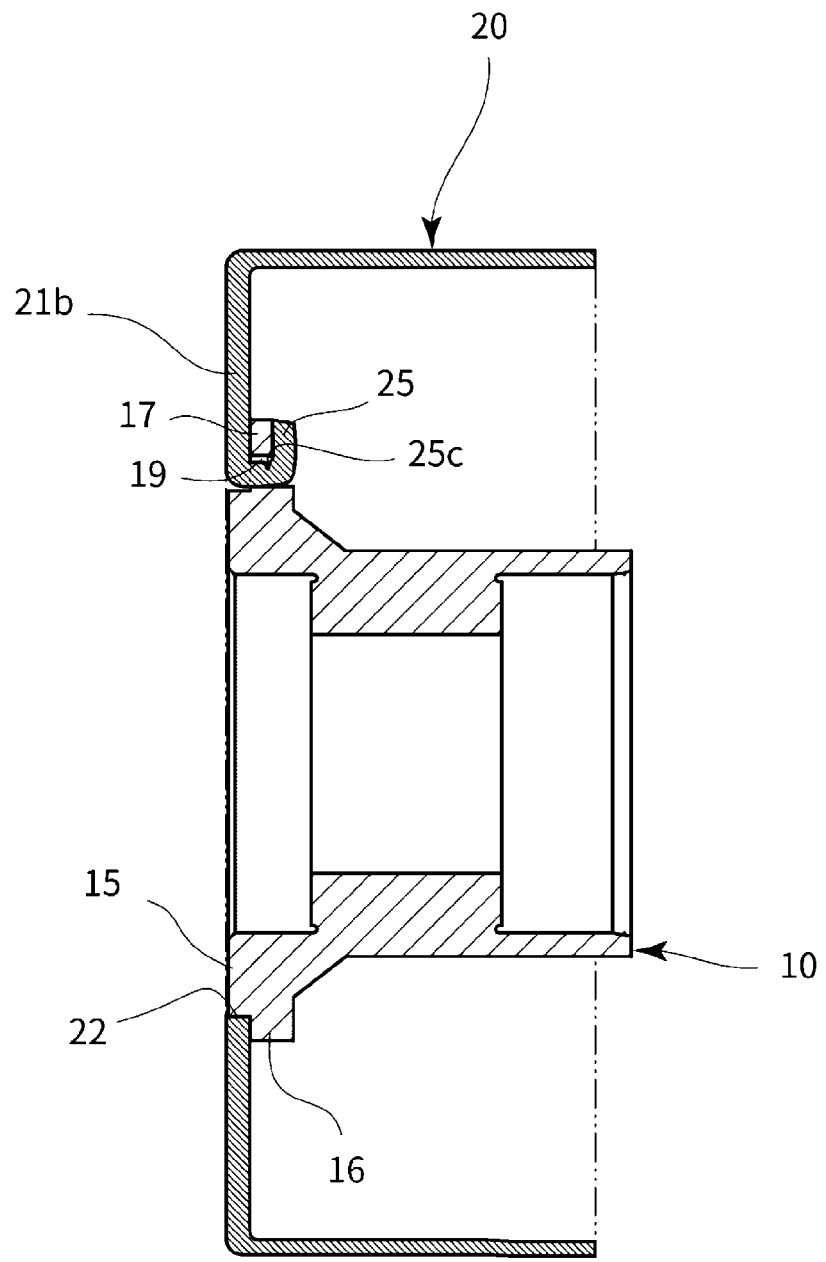
FIG. 9 is a third view for explaining the process of attaching the holder to the housing.

FIG. 7 is a first figure for explaining a process of attaching the holder 10 to the housing 20. FIG. 8 is a second figure for explaining the process of attaching the holder 10 to the housing 20. FIG. 9 is a third figure for explaining the process of attaching the holder 10 to the housing 20.

The cross sections shown in FIGS. 7 to 9 correspond to the cross section taken along the line A-A in FIG. 3 and the cross section taken along the line C-C in FIG. 5.

As shown in FIG. 7, the holder 10 is placed at the front surface 21b from the rear of the housing 20. As shown in FIG. 8, the holder 10 is placed on the housing 20 such that the front surface of the outer peripheral portion 16 including the extending portion 17 comes into contact with the back surface of the front surface 21b. At this time, the protruding portions 15 of the holder 10 are fitted into the inner peripheral portion 22. In this way, the position in the radial direction of the holder 10 to the housing 20 can be easily positioned. Further, at this time, the corresponding protruding portion 25 of the housing 20 is inserted into each of six hole portions 19. In this way, the position (posture around the shaft 2) in the circumferential direction of the holder 10 to the housing 20 can be easily positioned. Further, at this time, the outer peripheral portion 16 is placed at a position where it is in contact with the front surface 21b. In this way, the position, in the rotational axis direction, of the holder 10 to the housing 20 can be easily positioned.

When the holder 10 is disposed in the housing 20 in this manner, the six protruding portions 25 pass through the six hole portions 19 and leading ends 25b of the protruding portions 25 are located rearward of the extending portions 17. At this state, the protruding portions 25 having passed through the hole portions 19 are bent radially outward (the direction indicated by the solid arrow in FIG. 8).

Meanwhile, the protruding portions 25 can be bent by various methods. For example, each of the protruding portions 25 can be bent radially outward by pressing, in the forward direction, a jig TL having a bending processing surface at a position corresponding to the protruding portion 25. Meanwhile, such a bending process may be performed twice or multiple times while changing the shape or position of the jig TL, thereby reliably bending the protruding portions 25.

When the protruding portions 25 are bent in this manner, the protruding portions 25 are in a state of being bent as shown in FIG. 9. In this way, the holder 10 is fixed to the housing 20. At this time, a part of the outer peripheral portion 16 of the holder 10 is located between the front surface 21b of the housing 20 and portions of the plurality of protruding portions 25 that are bent. That is, the six extending portions 17 are sandwiched between the front surface 21b of the housing 20 and a part of each of the plurality of protruding portions 25 in the front and rear direction. In this way, the holder 10 is rigidly fixed to the housing 20. In other words, the holder 10 is fixed to the housing 20 by crimping the protruding portions 25 of the housing 20.

By bending the protruding portions 25 at a plurality of positions in the circumferential direction as described above, the holder 10 is fixed to the housing 20 by bending and crimping. In this way, the attachment strength of the holder 10 to the housing 20 is increased.

A structure in which a holder is fixed to a housing by, for example, so-called buffing and crimping has been adopted. However, in this structure, for example, when a motor is used in such a manner that a vertical force is applied to a shaft (lateral pressure is applied), such as a case where a pulley is provided in a motor shaft to drive equipment, there is a possibility that the crimped portion is deformed and the operation of the motor becomes poor. In contrast, in the motor 1 having the structure of the present embodiment, the plurality of protruding portions 25 is relatively largely bent in the radial direction and the holder 10 is supported on the housing 20. Therefore, even when the motor 1 is used in such a manner that a relatively large lateral pressure is applied to the shaft 2, the deformation of the bent portion hardly occurs. In this way, the durability of the motor 1 can be improved and the performance of the motor 1 is desirably maintained for a long time.

Further, in the present embodiment, the extending portions 17 are sandwiched between the protruding portions 25 and the front surface 21b in a state where the outer peripheral portion 16 of the holder 10 is in contact with the inner peripheral portion 22 of the front surface 21b of the housing 20. Therefore, the shaft 2 can be supported over a relatively wide range between the holder 10 and the front surface 21b of the housing 20 especially even when the lateral pressure applied to the shaft 2 is large. As a result, the motor 1 can withstand the large lateral pressure applied to the shaft 2.

The bearings 81, 82 of the motor 1 are held by a single holder 10. Further, the position, in the radial direction, of the holder 10 to the housing 20 is positioned by a spigot structure in which the protruding portions 15 are fitted to opening portions on the side of the housing 20. Therefore, it is possible to obtain high machining accuracy and assembly accuracy, as compared with a structure in which the bearings are held on the housing by drawing or the like, for example. In this way, the accuracy of the coaxiality and the perpendicularity of the axis can be relatively easily increased, and a structure resistant to the lateral pressure can be obtained. Further, since the bearings 81, 82 are held by the relatively thick holder 10, the rigidity of the motor 1 can be increased.

Meanwhile, in the present embodiment, as described above, the outer diameter D1 of the protruding portions 15 of the holder 10 is set to be equal to or slightly less than the inner diameter D2 of the opening portion formed by the inner peripheral portion 22 of the housing 20. The fit between the outer diameter D1 and the inner diameter D2 is set so that the holder 10 can be accurately attached to the housing 20. That is, the outer diameter D1 and the inner diameter D2 are set so that any gap does not occur between the protruding portion 15 and the inner peripheral portion 22 facing each other in the radial direction. In this manner, the holder 10 can be accurately attached to the housing 20. Meanwhile, a gap may be provided between the protruding portion 15 and the inner peripheral portion 22 facing each other in the radial direction.

Here, in the present embodiment, the groove portion 25c is formed along the circumferential direction on the outer surface in the radial direction of each of the six protruding portions 25. As shown in FIG. 9, each protruding portion 25 is bent in such a manner that the portion where the groove portion 25c is formed becomes a valley.

Figure 10:
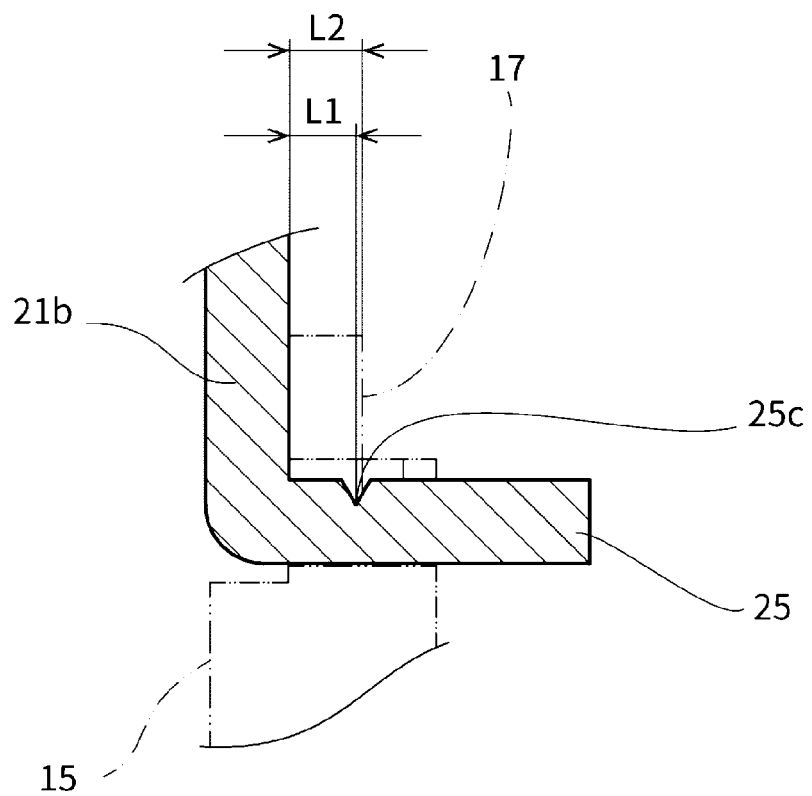
FIG. 10 is a partial enlarged sectional view showing a part where a groove portion is formed.

FIG. 10 is a partial enlarged sectional view showing a part where the groove portion 25c is formed.

In FIG. 10, the region around the groove portion 25c in the cross section shown in FIG. 8 is shown. The two-dot chain line in FIG. 10 shows the holder 10.

As shown in FIG. 10, the groove portion 25c is recessed radially inward from the outer surfaces of the protruding portions 25 in the radial direction. The cross-sectional shape of the groove portion 25c is, for example, a V-shape. When the groove portion 25c is formed in the protruding portions 25 in this manner, the stress can be concentrated on the groove portion 25c and the protruding portions 25 can be easily bent radially outward. Further, when a bending force is applied to the protruding portions 25, the stress can be concentrated on a specific region in the vicinity of the groove portion 25c. In this way, the protruding portion 25 can be bent at a specific position. As a result, the attachment of the holder 10 to the housing 20 can be easily performed.

In the present embodiment, a dimension L1 (the height L1 of the groove portion 25c) in the rotational axis direction from the rear surface of the front surface 21b of the housing 20 to the groove portion 25c before the holder 10 is attached is smaller than a dimension L2 (the thickness L2 of the extending portion 17) in the rotational axis direction of the extending portion 17 sandwiched between the protruding portion 25 and the front surface 21b. In this manner, since the height L1 of the groove portion 25c is smaller than the thickness L2 of the extending portion, the protruding portion 25 is likely to come into contact with the rear surface of the extending portion 17 at a position close to the hole portion 19 when the protruding portion 25 is bent. As a result, it is possible to more reliably fix the holder 10 to the housing 20.

[Description of Modification]

Figure 11:
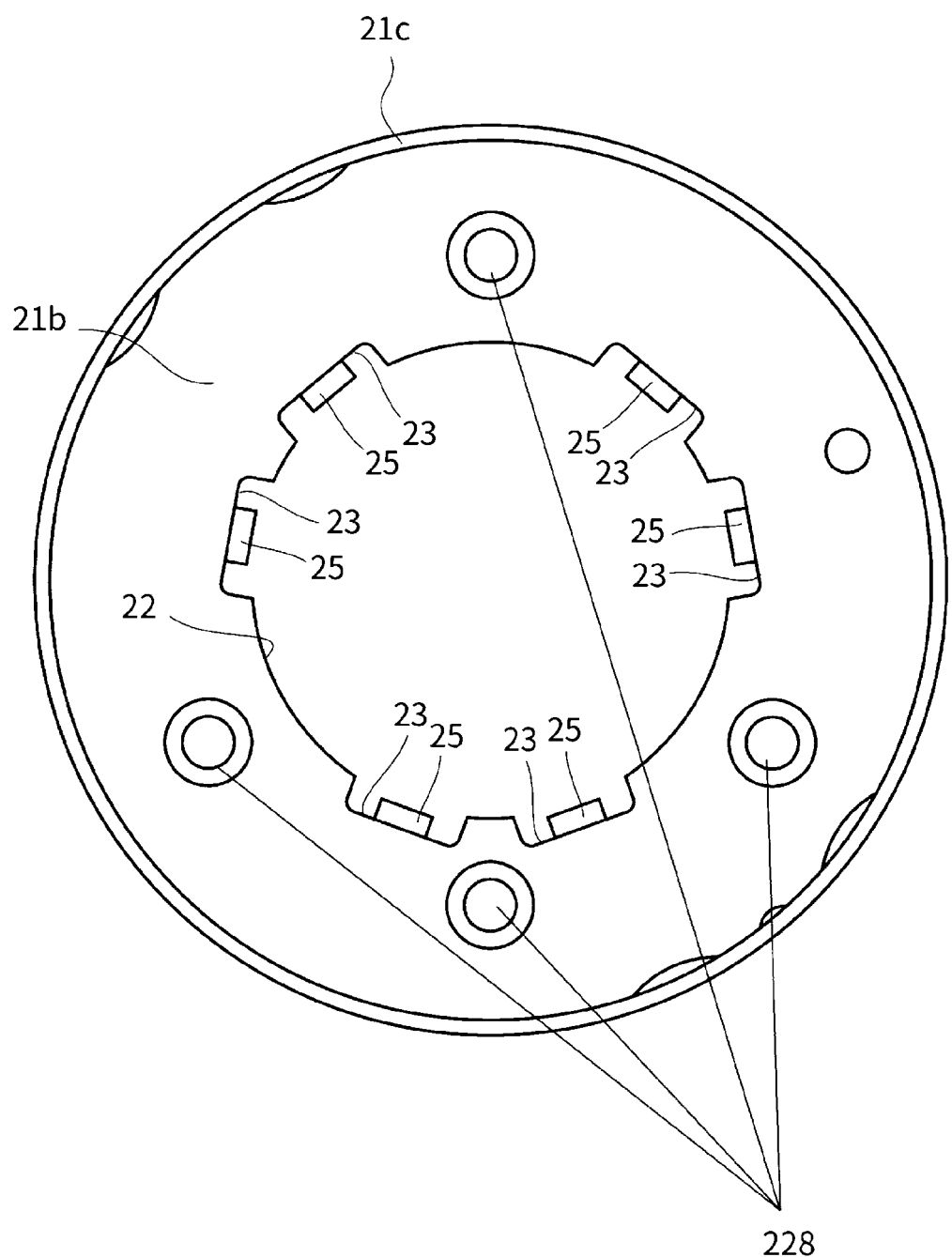
FIG. 11 is a rear view (back elevation view) of a housing of a motor according to a modification of the present embodiment, showing a state where a holder is not attached to the housing.
Figure 12:
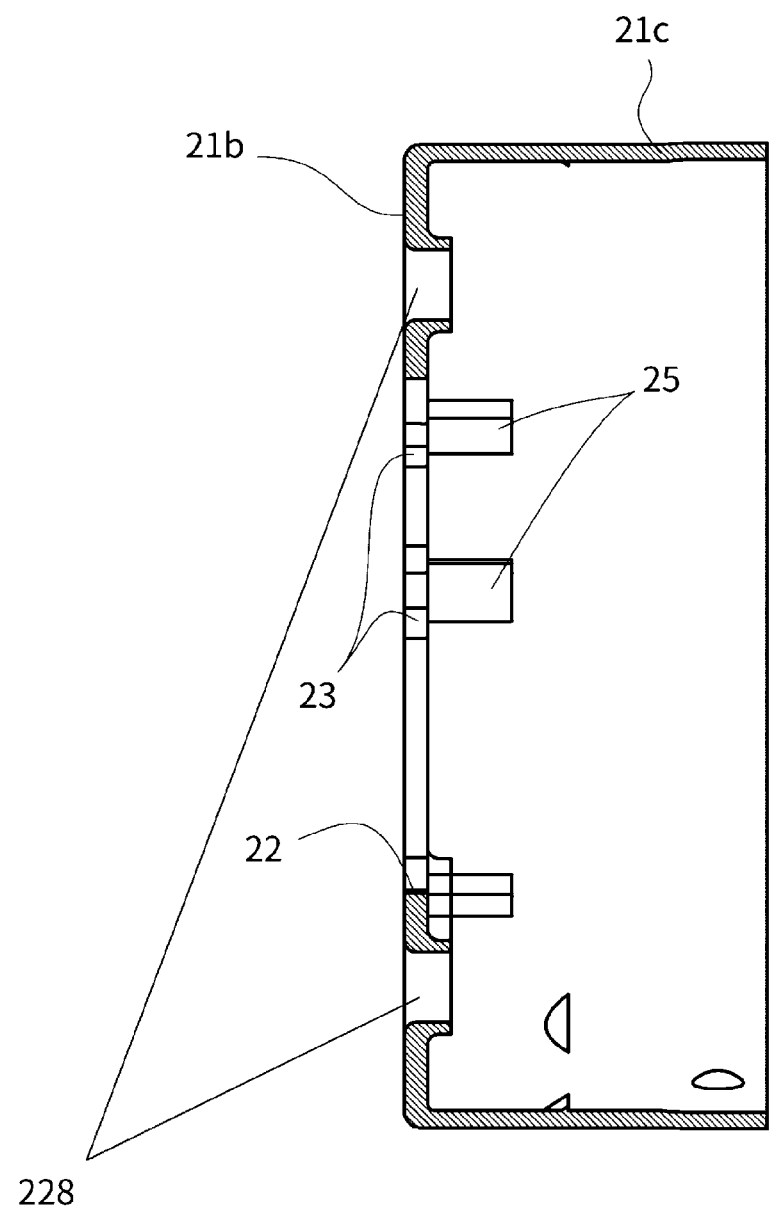
FIG. 12 is a side sectional view of FIG. 11.

FIG. 11 is a rear view (back elevation view) of a housing 220 of the motor 1 according to a modification of the present embodiment, showing a state where the holder 10 is not attached to the housing 220. FIG. 12 is a side sectional view of FIG. 11.

In the following description, the same components as those of the above-described housing 20 will be denoted by the same reference numerals.

The housing 220 is different from the housing 20 according to the above-described embodiment in that a plurality of screw hole portions 228 is provided in the front surface 21b. The other structure of the housing 220 is the same as the housing 20.

In the present modification, the housing 220 has four screw hole portions 228. As shown in FIG. 12, each of the screw hole portions 228 passes through the front surface 21b of the housing 220 in the rotational axis direction. Each of the screw hole portions 228 is formed by, for example, burring the front surface 21b of the housing 220 and then providing a female thread. However, the disclosure is not limited thereto.

By providing the screw hole portions 228 in the housing 220, the motor 1 can be mounted on equipment or the like using the screw hole portions 228, for example, without using the plate 9. Further, the screw hole portions 228 may be used for attaching the plate 9 to the motor 1.

Meanwhile, three of the four screw hole portions 228 are arranged at positions of the front surface 21b where an interval between the adjacent dent portions 23 is relatively large. Further, the other of the four screw hole portion 228 is provided at a position between any two of the three screw hole portions 228 in the circumferential direction. In this way, the rigidity of the front surface 21b of the housing 220 can be maintained relatively high, and the performance of the motor 1 can be maintained high. Meanwhile, the number and size of the screw hole portions 228 are not limited thereto.

[Others]

The motor is not limited to an inner rotor type brushless motor, but may be an outer rotor type motor, an inner rotor type brushed motor, or an outer rotor type brushed motor, or the like.

A part of the configuration of each component of the motor in the above-described embodiment may be configured by other configurations.

The insulator, or the substrate, or the like may be disposed completely inside the housing.

The frame supporting the holder may not be the housing as described above. The frame may not have the tubular outer peripheral portion, for example, such as the above-described housing. For example, the frame may be a substantially plate-like frame.

It is to be understood that the above-described embodiments are illustrative in all aspects and not restrictive. The scope of the disclosure is defined not by the above description, but by the claims. Further, it is intended to include meanings equivalent to the claims and all modifications within the scope.

The disclosure provides illustrative, non-limiting examples as follows:

A first aspect of the present disclosure is a motor including: a frame including an inner peripheral portion; a holder supported by the frame; a shaft passing through the inner peripheral portion of the frame; and a bearing supporting the shaft, and the holder includes: a tubular portion holding the bearing; and an outer peripheral portion including a plurality of hole portions arranged in a circumferential direction, and portions of the inner peripheral portion of the frame is inserted into the plurality of hole portions.

A second aspect of the present disclosure is characterized in that in the first aspect, each of the portions of the inner peripheral portion of the frame passing through the plurality of hole portions is bent.

A third aspect of the present disclosure is characterized in that in the first aspect or the second aspect, the frame includes an attachment surface attaching to the holder, the inner peripheral portion of the frame is arranged at the attachment surface, a plurality of protruding portions are arranged in the circumferential direction at the attachment surface, the plurality of protruding portions being the portions of the inner peripheral portion of the frame, and the plurality of protruding portions protrude toward the holder and pass through the plurality of hole portions.

A fourth aspect of the present disclosure is characterized in that in the third aspect, each of the plurality of protruding portions includes a plate shape, portions of the plurality of protruding portions passing through the hole portions are bent, and a portion of the outer peripheral portion of the holder is arranged between the attachment surface and the portions of the plurality of protruding portions.

A fifth aspect of the present disclosure is characterized in that in the fourth aspect, a recessed portion is formed at one surface of each of the plurality of protruding portions, each of the plurality of protruding portions being bent, and the one surface is bent, and the one surface and the attachment surface are facing each other.

What is claimed is:

1. A motor comprising:
a frame including an inner peripheral portion;
a holder supported by the frame;
a shaft passing through the inner peripheral portion of the frame; and
a bearing supporting the shaft,
wherein the holder includes:
a tubular portion holding the bearing; and
an outer peripheral portion including a flange extending radially, the flange having a plurality of hole portions arranged in a circumferential direction,
wherein portions of the inner peripheral portion of the frame are inserted into the plurality of hole portions of the flange, and are bent to extend radially outwardly.

2. The motor according to claim 1,
wherein the frame includes an attachment surface attaching to the holder,
wherein the inner peripheral portion of the frame is arranged at the attachment surface,
wherein a plurality of protruding portions are arranged in the circumferential direction at the attachment surface, the plurality of protruding portions being said portions of the inner peripheral portion of the frame, and
wherein the plurality of protruding portions protrude toward the holder and pass through the plurality of hole portions.

3. The motor according to claim 2, wherein each of the plurality of protruding portions includes a plate shape, and wherein a portion of the outer peripheral portion of the holder is arranged between the attachment surface and portions of the plurality of protruding portions.

4. The motor according to claim 3,
wherein a recessed portion is formed at one surface of each of the plurality of protruding portions,
wherein the one surface is bent, and the one surface and the attachment surface are facing each other.

5. The motor according to claim 1, comprising a stator including a coil, wherein the stator is fixed to the frame.

6. The motor according to claim 1, wherein the tubular portion of the holder, holding the bearing, is arranged radially inwardly with respect to an outer peripheral portion of the holder.

7. The motor according to claim 1, comprising a rotor, wherein the frame accommodates the rotor,
the rotor comprises a rotary said shaft, a rotor yoke attached to the shaft and having an opening facing toward the frame, and a magnet attached to an outer surface of the rotor yoke,
and wherein an inner portion of the holder is disposed inside of the rotor yoke.

* * * * *